Inventors.
Douglas G. Hann
Robert F. Ramsay

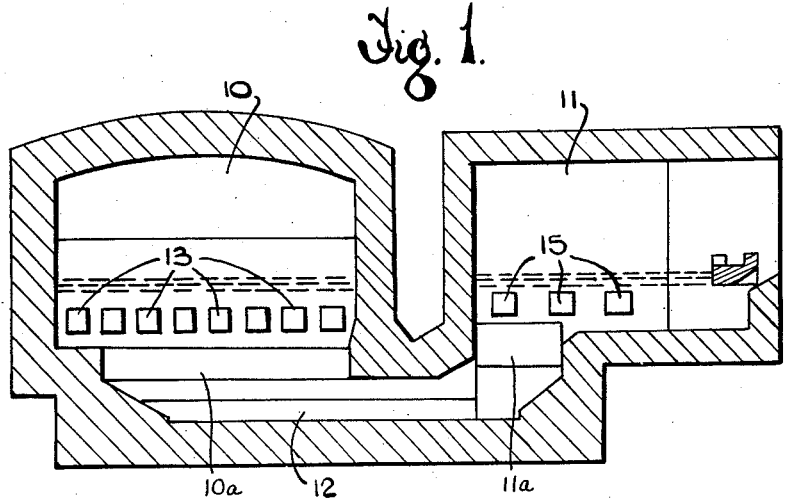
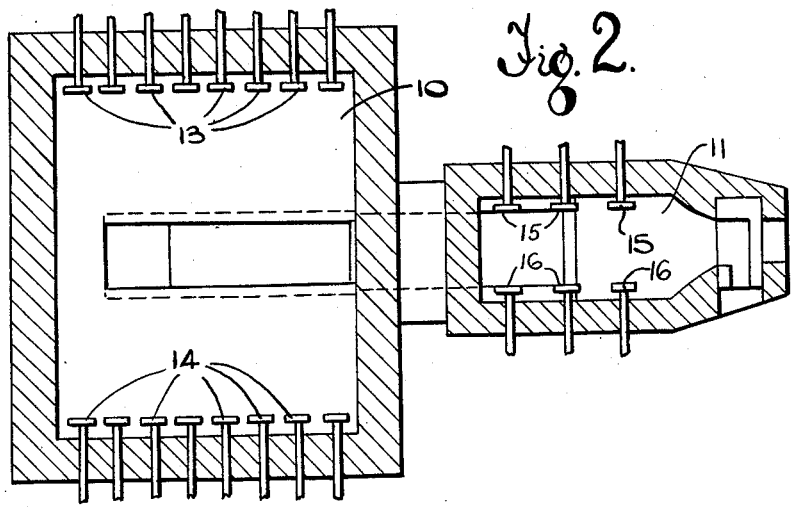

INVENTORS.
Douglas G. Hann
Robert F. Ramsay
By Kurt Kelman
agent

INVENTORS.
Douglas Graeme Hann
Robert Fleming Ramsay
BY Kurt Kelman
Agent.

United States Patent Office 3,098,111
Patented July 16, 1963

3,098,111
FURNACE FOR MELTING OR REFINING
GLASS ELECTRICALLY
Douglas Graeme Hann, Ryton, Shifnal, and Robert Fleming Ramsay, Tilgate, Crawley, England, assignors to Elemelt Limited, Bilston, England, a British company
Filed Oct. 19, 1961, Ser. No. 146,265
10 Claims. (Cl. 13—6)

This invention relates to methods of and furnaces wherein glass is heated by the passage of alternating electric current therethrough (such methods and furnaces hereinafter being referred to as being of the kind specified).

A specific form of furnace to which the invention may be applied comprises a furnace chamber and a further chamber which is connected with the furnace chamber by a duct through which the molten glass and an alternating current can be caused to flow.

The furnace chamber may be a melting chamber into which the batch materials in solid form are fed and melted, in which case the further chamber is either a refining chamber (no refining or only partial refining taking place in the melting chamber). Alternatively the furnace chamber may be both a melting chamber and a refining chamber, the further chamber then being a storage chamber such as a forehearth from which the glass refined in the furnace chamber is fed out directly or indirectly for fabrication. Alternatively the furnace chamber may be a refining chamber (which has been preceded by a melting chamber) and the further refining chamber or a storage chamber such as a forehearth.

In our U.S. Patent No. 2,899,476 we have disclosed a method of and furnace wherein the distribution of electric current over the cross-section of the current path along which it passes through the glass (and in particular the distribution of electric current which passes through the duct connecting a furnace chamber and a further chamber) can be controlled.

The specific form of furnace therein described and illustrated includes the provision of a tapped inductance which is connected in parallel with electrodes spaced apart crosswise of the current path at one station at which the duct current is communicated to the glass, and a slider connected selectively to one of the tapping points of the inductance and to a second source of alternating voltage the other pole of which is connected to electrodes at a station spaced longitudinally of the current path and is provided for the purpose of enabling the current distribution to be controlled.

Whilst this specific arrangement does in practice provide satisfactory control in conditions wherein the current to be passed through the duct is of moderate value, i.e. 500 amperes or less, the employment of higher values of current of the order of 1000 amperes may necessitate the employment of more than one tapped inductance, these being then connected in parallel with each other, and there is then some complication in the connections of the two sliders to ensure that each of the tapped inductances contributes its proper function.

One of the objects of the present invention is to provide a new or improved method of producing a supply of molten glass in which control is exercised over the temperature distribution in a cross-sectional area of the path along which heating current flows through the glass and which will avoid the complication referred to especially when high current values are employed.

A further object of the invention is to provide in a glass melting furnace a new or improved arrangement of electrodes and supply circuit therefor which permit of control being exercised over the distribution of current in a transverse cross-section of the path along which heating current flows through the glass without said complication.

Yet another object of the invention is to provide an arrangement of electrodes in the supply circuit which has a high degree of flexibility as to the particular positioning of the electrodes and voltages applied relatively therebetween to enable a high degree of control to be exercised over the electric currents flowing between the various electrodes through a body of molten glass.

From one aspect the present invention resides in the provision in a glass melting furnace having at least one chamber for containing a body of molten glass, of means for heating said glass by the passage of alternating electric current along a path therethrough and for effecting control over the distribution of current over a transverse cross-section of said path, comprising a first electrode means including respective electrodes spaced apart crosswise of the current path, a second electrode means spaced from the first electrode means longitudinally of the current path, a first source of alternating voltage connected between the electrodes of the first electrode means, a second source of alternating voltage including at least a component in quadrature with the first source and connected between the first and second electrode means, a third source of alternating voltage connected in circuit with at least one of said first and second sources, and means for varying said third source of voltage to vary the magnitude of the resultant voltage appearing between the second electrode means and one of said electrodes of the first electrode means relatively to the resultant voltage appearing between the second electrode means and another one of said electrodes of the first electrode means.

The second alternating voltage preferably has a phase angle which is in quadrature or approximately so with the first alternating voltage. By approximately is meant within plus or minus 30 degrees. The third alternating voltage is preferably applied in series with the second alternating voltage and is in quadrature thereto or approximately so.

According to a further aspect of the invention we provide a furnace for glass melting by the passage of an alternating electric current therethrough comprising in a furnace chamber or system thereof, a first electrode means including respective electrodes spaced apart crosswise of the current path, second electrode means spaced longitudinally of the current path from the first electrode means, a first source of alternating voltage connected between the electrodes of the first electrode means, a second source of alternating voltage furnishing a voltage having a phase angle which is greater than zero and less than 180 degrees with respect to the voltage furnished by the first source, the second source of alternating voltage being connected between the first and second electrode means characterised by the provision of a third source of alternating voltage connected in circuit with one of the first or second sources of alternating voltage and variable in magnitude or phase or in respect of both these quantities to vary the magnitude of the resultant voltage appearing between the second electrode means and one of the electrodes of the first electrode means relatively to that appearing between the second electrode means and the other of the electrodes of the first electrode means and hence to control the distribution of current over a transverse cross-section of the current path between the first and second electrode means.

The invention will be described by way of example with reference to a specific embodiment thereof and manner of performing same illustrated in the drawings accompanying the specification wherein:

FIGURE 1 is a view in cross-section in end elevation of one embodiment of glass melting and refining furnace for carrying out the method of the invention.

FIGURE 2 is a plan view in cross-section of the same embodiment.

Referring firstly to FIGURES 1 and 2 of the drawings the furnace shown therein includes a furnace chamber 10 in which both melting and defining operations are conducted, that is to say, batch materials in solid form are heated until they liquify and the molten body of glass undergoes refining in consequence of the temperature at which it is maintained.

The furnace also comprises a further chamber 11 from which the glass when melted and refined is fed out for use by a suitable feeder device (not shown).

Figure 3:
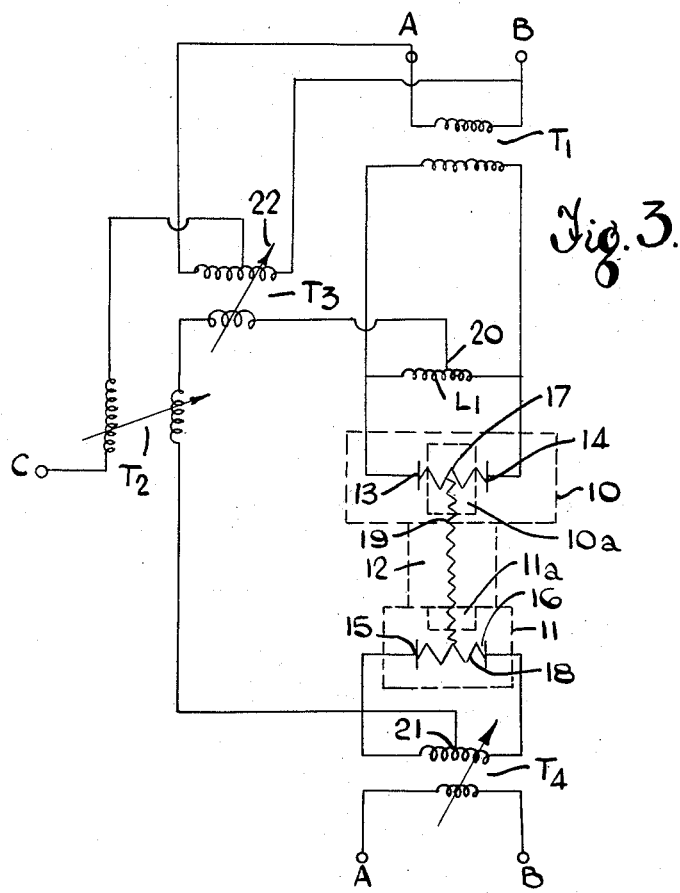
FIGURE 3 is a simplified circuit diagram showing the various electrode means, source of voltage and connections between these and the electrode means.

The chamber 11 is connected with the chamber 10 by a duct 12 which communicates with them by way of openings in the bottom walls of these chambers as indicated in broken lines 10a and 11a in FIGURE 3.

The chamber 10 contains electrodes 13 and 14 which are disposed at opposite ends of the opening 10a and are submerged beneath a molten body of glass contained in the chamber 10. Preferably the electrodes 13 and 14 extend for substantially the whole width of the furnace chamber 10 and for a substantial proportion of the depth of the furnace chamber therein. It will be understood that they are shown for simplicity as single electrodes, but in practice each will comprise a plurality of electrodes strapped together electrically.

Similarly the chamber 11 contains electrodes 15 and 16 which again are shown as single electrodes for simplicity, it being understood that each may comprise a plurality of separate electrodes strapped together electrically.

The current paths between these electrodes are indicated diagrammatically by resistances 17 and 18 for the two chambers and by a further resistance 19 which extends lengthwise of the duct and may be considered as emerging at the central regions of the openings 10a and 11a to intersect with the current paths 17 and 18.

As referred to in our prior Patent 2,899,476 there is a tendency for the current path 19 to become displaced to one side of the duct 12 or the other from various causes therein mentioned.

The present invention provides an improved method of and means for correcting this tendency.

The electrodes 13 and 14 are energised by a first source of alternating voltage comprising a transformer T1 the secondary winding of which is connected to the electrodes and the primary winding of which is connected to terminals designated A and B and representing a single phase AB of a three phase supply.

Current along the path 19 is produced by a second source of alternating voltage comprising a transformer T2 the primary winding of which is furnished with a voltage in quadrature with that of the phase AB produced by connecting one terminal of the primary winding to the third phase C and the other terminal to a centre tap between phases A and B this centre tap conveniently being furnished by a centre tapped primary winding on a third transformer T3. This manner of connection is equivalent to the known "Scot" connection.

Electrodes 15 and 16 are connected to a fourth source of alternating voltage comprising a transformer T4 the primary winding of which is connected to the phases A and B.

The purpose of the transformer T3 is to introduce a balancing voltage which will correct lateral displacement of the current path 19, and for this purpose the secondary winding of the transformer T3 is connected in series with that of the transformer T2 these two windings applying a resultant voltage between a centre tap on the secondary winding of the transformer T4 and a centre tap on the inductance L1 connected in parallel with the electrodes 13 and 14, although possibly a centre tap could instead be provided on the secondary winding of transformer T1 for this purpose.

It will however be observed that operation of the circuit does not rely on any shifting of the tapping point to the secondary winding of transformer T4 or inductance L1, but is achieved in the manner now described.

Figure 4:
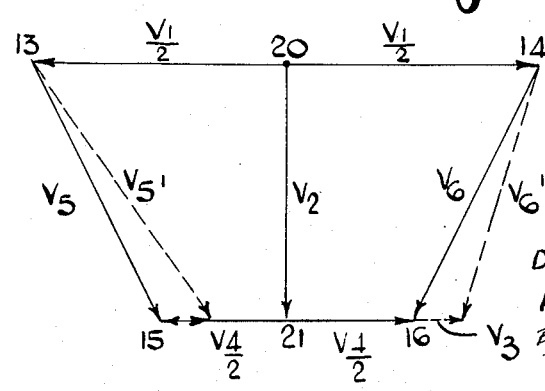
FIGURE 4 is a vector diagram of the voltages appearing between the electrodes.

In the vector diagram shown in FIGURE 4, the various voltages appearing between points in the circuit diagram are shown as extending between correspondingly numbered points. It will be observed that starting from the point 20 namely the centre tap of the inductance L1 the voltage appearing across the secondary winding V1 is represented by two opposite vectors $$\frac{V_1}{2}$$

Similarly from the point 21 two opposite vectors $$\frac{V_4}{2}$$

represents the voltage V4 appearing across the secondary winding of the transformer T4. The voltage furnished by the transformer T2 is indicated at V2 and that furnished by the transformer T3 by V3. The resultant voltages appearing between electrodes 13 and 15 on the one hand, and 14 and 16 on the other hand are represented at V5 and V6.

Assuming that the conditions of operation of the duct 12 and in the two chambers 10 and 11 were such that there was no tendency for the current path 19 to become displaced to one side or the other side of the duct, the appropriate conditions of operation would be for the voltage furnished by the transformer T3 namely V3 to be zero in which case it will be observed that since V1 and V2 are in quadrature and 20 is the centre tap of the circuit connecting electrodes 13 and 14 whilst 21 is also the centre tap of the circuit connecting electrodes 15 and 16, the resultant voltages V5 and V6 would be equal.

If, for example however, cooling takes place on the left-hand side of the duct 12 so that the resistance of the glass present at this side tends to increase, it is necessary in order to prevent the current becoming displaced to the right hand side, for the voltage V5 to be increased relatively to V6.

This is accomplished by setting the transformer T3 to furnish a voltage V3 and the resultant values of V5 and V6 are then indicated at V5' and V6'.

It will be appreciated that the transformer T3 is provided with means indicated generally by the arrow 22 for adjusting the magnitude of the voltage V3 and reversing the phase thereof. Transformers incorporating such adjustment means are commercially available.

Consequently the voltage V3 can be adjusted to the desired value either in phase or in anti-phase with the voltage V4 the result being an effective shifting of the voltage vector 15, 16 representing the voltage V4 either to the left or to the right as required.

The need for variation in the setting of the adjustment means 22 of the transformer T3 as well as the setting to which these means should be moved, may be effected by measurement of the currents in the leads joining the ends of the tapped inductance L1 to the electrodes 13 and 14. This may be done by connecting ammeters to current transformers coupled inductively with these leads. The currents in these two leads will be equal assuming that conditions in the two chambers 10 and 11 and in the duct 12 are symmetrical as regards heat loss and with respect to a centre line passing longitudinally through the duct and the chambers.

However if operational conditions result in the heat loss at one side of this reference axis being greater than the heat loss at the other side the currents in the two leads referred to will no longer be equal, and the adjustment means 22 is then operated to bring them back to equality.

If it should be found that the optimum best overall distribution of current over transverse cross-section of the duct is achieved by a deliberate inequality in the two currents to the electrodes 13 and 14 respectively, then the setting of the adjustment means 22 would of course be selected to produce this deliberate inequality.

In some cases it may be more convenient to measure departure from proper operating conditions as to the position of the current path in the duct 12 by comparison of the currents in the leads joining the secondary winding of transformer T4 to the electrodes 15 and 16.

It will be understood that the value of the voltage furnished by the secondary windings of transformers T1, T2 and T4 may be adjusted as required by the provision of adjustment means incorporated in or associated with these transformers. Conveniently, this is accomplished in the case of transformers T2 and T4 by the employment of transformers which incorporate adjustment means whilst in the case of transformer T1 this may be fed from a variable voltage supply in which case the primary winding of the transformer T3 may either be connected to this supply or to a supply of fixed magnitude, but of the same phase as that which feeds the primary transformer T1.

It will be further understood that although as illustrated in the vector diagram the most convenient manner of operation is one in which the second voltage V2 is in quadrature with the first voltage V1, it is not essential that a strict quadrature relationship should necessarily be maintained. The essential condition is that the injection of the voltage V3 into the circuit which includes the current path through the duct 12 should produce an increase in the voltage V6 and a reduction in the voltage V5 or vice versa.

The departure from the quadrature relation of the voltages V1 and V2 which can be tolerated depends upon the relative magnitudes of the voltages V1 and V4 but in general it is contemplated that satisfactory operation can be achieved for departures from quadrature relationship from up to 30 degrees.

Figure 5:
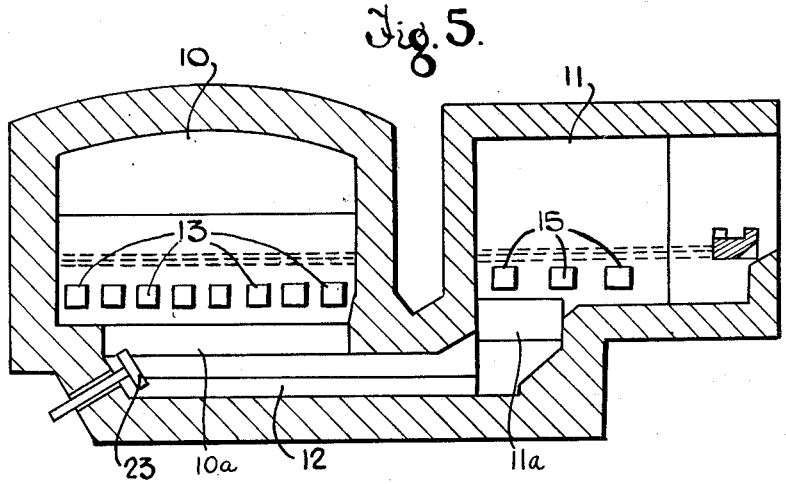
FIGURE 5 is a view similar to FIGURE 1 illustrating an alternative embodiment of furnace.
Figure 6:
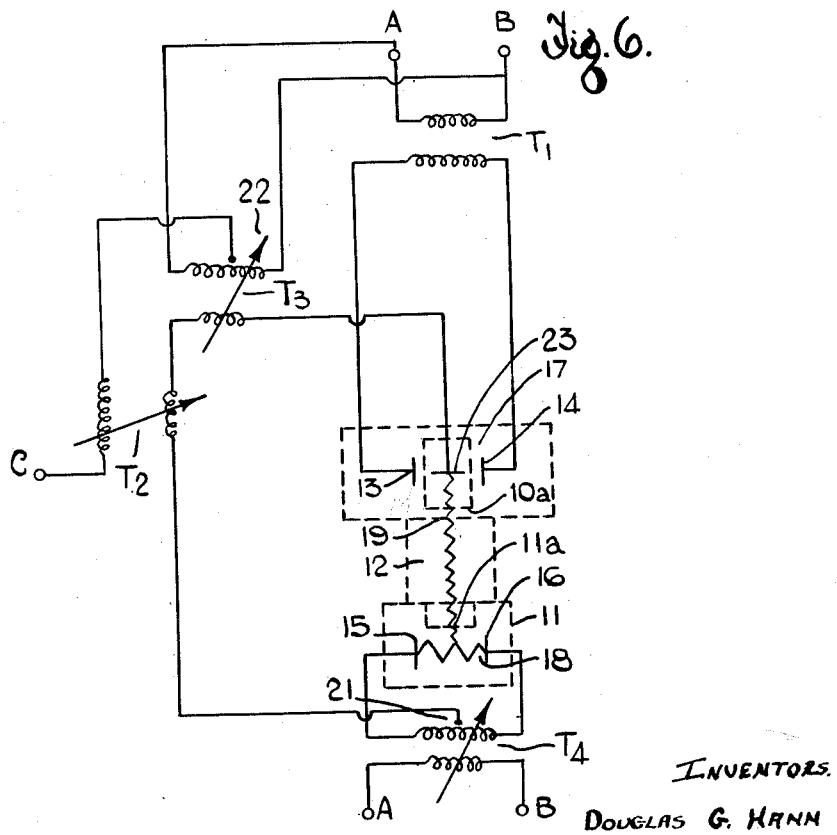
FIGURE 6 is a circuit diagram similar to FIGURE 3 but applicable to the embodiment of FIGURE 5.

In the embodiment illustrated in FIGURES 5 and 6 wherein parts of the furnace corresponding to those shown in the previously described embodiment are designated by like numerals of reference the furnace is modified in that an additional electrode 23 is disposed in the duct 12 beneath the opening in the bottom wall of the furnace chamber 10.

The electrode 23 is preferably disposed medially of the duct 12 as viewed in plan and includes a body of plate-like form presenting one of its faces in a direction which is predominantly lengthwise of the duct 12.

The current flowing through the duct 12 is now introduced by the electrode 23 instead of being introduced by the two electrodes 13 and 14 as was the case in the previously described embodiment. The centre tapped inductance L1 is not now necessary since the current to the duct is in effect introduced at a point which corresponds electrically with the junction of the current paths 17 and 19.

Correction of any tendency for the current path 19 to become displaced to one side or the other of the duct 12 is effected by adjustment of the transformer T3 in the same manner as described in the previous embodiment except that the current transformers and ammeters would be coupled inductively with the leads to the electrodes 15 and 16. The conditions represented by the vector diagram of FIGURE 2 in the same way.

One of the advantages of introducing current by means of the electrode 23 is that it minimises any tendency to erosion at the boundary of the opening in the bottom wall of the furnace chamber nearest the further chamber 11 since the current through the duct tends to be more uniformly distributed over the cross-section of the duct considered in a vertical direction. There is thus also less tendency for glass in the bottom of the duct to cool to an undesirable extent relatively to glass in the upper part of the duct.

Figure 7:
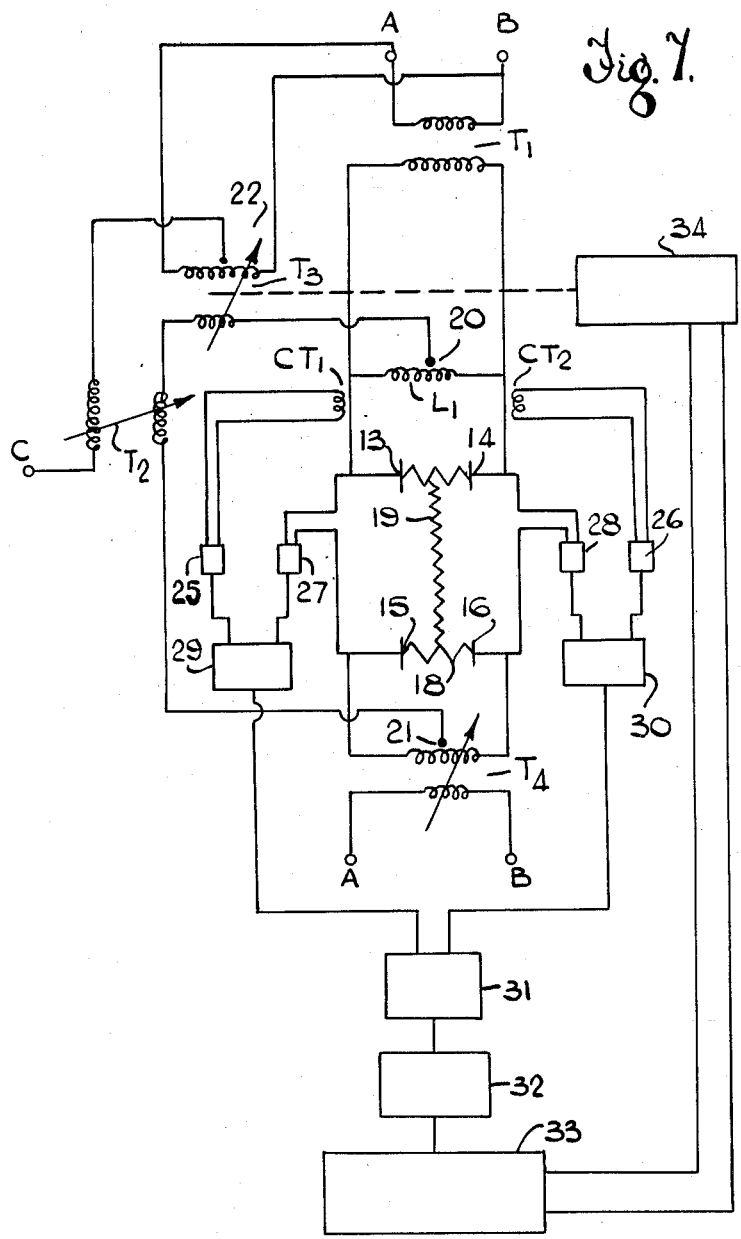
FIGURE 7 is a circuit diagram similar to FIGURE 3 providing for automatic operation.

If it is desired that the adjustment means 22 of the transformer T3 shall be adjusted automatically to maintain proper distribution of current passing through the duct, this may be achieved by employment of a circuit as illustrated in FIGURE 7 wherein components corresponding to those shown in FIGURE 1 are designated by like numerals of reference.

In order to derive a signal capable of controlling the adjustment means measurement is made of a quantity which is determined by the temperature of the glass at each side of the duct. This may be the current flowing to the two electrodes 13 and 14, but preferably as shown measurement is made of the electrical resistance afforded by the path through the glass from each of these electrodes respectively to the electrodes 15, 16 considered collectively.

For this purpose current transformers CT1 and CT2 are inductively coupled with the conductors which feed the current from the secondary winding of transformer T1 to the electrodes 13 and 14, and voltage signals are derived from measurement of voltage between electrodes 13 and 15 on the one hand and 14 and 16 on the other hand. Current signal networks 25 and 26 receive the current signals, and voltage signal networks 27 and 28 receive the voltage signals, and pass these respectively to monitoring relays or computors 29 and 30. Such relays or computors may be of a known type capable of providing an output signal which is a quotient of the input signals. One suitable type of monitoring relay or computor is that manufactured by Evershed & Vignoles Ltd., under the designation "ER 92 Computor."

The output signals from the monitoring relays or computors 29 and 30 which are proportional to the electrical resistance through the paths previously mentioned are fed to a further monitoring relay or computor 31 which may be of the same type as those previously referred to but adapted to provide an output signal which is the difference of the input signals.

This output signal is then fed to an amplifier 32 and subsequently to a control circuit 33 before passage to a motor or actuating device 34 from which preferably there is a stabilising feed back to the control circuit 33.

It will be understood that it would be possible to apply a similar arrangement to the circuit diagram shown in FIGURE 6. In this case current transformers would be coupled to the conductors conveying current to the electrodes 15 and 16 and voltage signals would be derived between the electrode 23 and the electrodes 15 and 16 respectively.

Instead of measuring the glass resistance in the duct current measurement only may be used to provide the required control signals or temperature responsive devices such as thermo-couples may be embodied in the walls of the duct to provide the required signals for controlling the adjustment means 22 according to temperature difference between different sides or parts of the cross-sectional area of the glass contained within the duct 12.

What we claim then is:

1. In a glass melting furnace having at least one chamber for containing a body of molten glass, means for heating said glass by the passage of alternating electric current along a path therethrough and for effecting control over the distribution of current over a transverse cross-section of said path, comprising a first electrode means including respective electrodes spaced apart crosswise of the current path, a second electrode means spaced from the first electrode means longitudinally of the current path, a first source of alternating voltage connected between the electrodes of the first electrode means, a second source of alternating voltage including at least a component in quadrature with the first source and connected between the first and second electrode means, a third source of alternating voltage connected in circuit with at least one of said first and second sources, and means for varying said third source of voltage to vary the magnitude of the resultant voltage appearing between the second electrode means and one of said electrodes of the first electrode means relatively to the resultant voltage appearing between the second electrode means and another one of said electrodes of the first electrode means.

2. In a glass melting furnace having at least one chamber for containing a body of molten glass, means for heating said glass according to claim 1 wherein the first source of alternating voltage comprises a first supply circuit including a first transformer having a secondary winding connected to feed the electrodes of the first electrode means, the second source of alternating voltage comprises a second supply circuit including a second transformer having a secondary winding connected between the second electrode means and a point in the first supply circuit at which the voltage is at least approximately midway between those appearing at said electrodes of the first electrode means, said secondary windings furnishing voltages which are at least approximately in quadrature with each other, and the third source of alternating voltage comprises a third supply circuit including a third transformer having a secondary winding connected to at least one of said first and second supply circuits and furnishing a voltage at least approximately in phase alignment with that furnished by the secondary winding of the first transformer, said third transformer having means for varying the magnitude of said voltage furnished by its secondary winding.

3. In a glass melting furnace having at least one chamber for containing a body of molten glass means for heating said glass according to claim 2 wherein the first transformer has a primary winding between the first and second phases of a three phase supply and the second transformer has a primary winding connected between the third phase and a tapping point on a primary winding of the third transformer which primary winding is also connected between the first and second phases.

4. In a glass melting furnace having at least one chamber for containing a body of the molten glass, means for heating said glass according to claim 3 wherein the secondary winding of the third transformer is connected in series with the secondary winding of the second transformer.

5. In a glass melting furnace having at least one chamber for containing a body of molten glass means for heating said glass according to claim 1 wherein said second electrode means includes respective electrodes spaced apart cross-wise of the current path, these electrodes being connected to a fourth source of alternating voltage.

6. In a glass melting furnace having at least one chamber for containing a body of molten glass means for heating said glass according to claim 2 wherein said second electrode means includes respective electrodes spaced apart cross-wise of the current path, and these electrodes are connected to a secondary winding of a fourth transformer, said secondary winding furnishing a voltage at least approximately in phase with that furnished by said secondary winding of said first transformer and having a tapping point at least approximately electrically midway between its ends and connected to said secondary winding of said second transformer.

7. In a glass melting furnace having at least one chamber for containing a body of molten glass, means for heating said glass according to claim 1 wherein the furnace comprises a first chamber in which said first electrode means are disposed a further chamber in which said second electrode means are disposed and a duct connected to and extending between said first and further chambers and along which current flows between said first and second electrode means.

8. In a glass melting furnace having at least one chamber for containing a body of molten glass, according to claim 1 wherein there is further provided means responsive to temperature of the glass in respective paths between said electrodes spaced cross-wise and said second electrode means to furnish electrical signals, and control means responsive to said signals and an actuating device operatively connected with said control means and with said adjustment means of said third transformer to operate said adjustment means automatically to correct departure from predetermined temperature values in said paths.

9. In a glass melting furnace having at least one chamber for containing a body of molten glass according to claim 8 wherein the means responsive to temperature of the glass comprises computor means, voltage and current signal circuits connected thereto for feeding voltage and current signals pertaining to said respective paths to said computor means, which provides an output signal representing electrical resistance of the glass in said paths respectively and further computor means for comparing said resistance signals and connected with said actuating device to control operation thereof.

10. In a glass melting furnace having at least one chamber for containing a body of molten glass comprising a first chamber, a further chamber, and a duct connected to and extending between said first and further chambers, means for heating said glass by the passage of alternating electric current along a path therethrough and for effecting control over the distribution of current over a transverse cross-section of said path, comprising an electrode disposed in said duct adjacent to said first chamber, a second electrode means disposed adjacent to that end of said duct connected to said further chamber, said second electrode means including electrodes spaced apart cross-wise of said duct, a source of alternating voltage connected between said electrodes of said second electrode means, a further source of alternating voltage having at least a component in quadrature with the first said source connected between the first said electrode and said second electrode means, and a third source of alternating voltage connected in series with at least one of the first and second sources, and means for varying the third source of voltage to vary the voltage appearing between the first said electrode and one of the electrodes of the second electrode means relatively to that appearing between the first said electrode and the other of said electrodes of the second electrode means.

References Cited in the file of this patent
UNITED STATES PATENTS

| | | |
|---|---|---|
| 2,899,476 | Gell | Aug. 11, 1959 |
| 2,984,829 | Augsburger | May 16, 1961 |

FOREIGN PATENTS

| | | |
|---|---|---|
| 837,888 | Germany | May 2, 1952 |